Sept. 8, 1959 W. M. SHOOK 2,903,294
GRAPPLE FOR MATERIAL HANDLING AND EARTH MOVING APPARATUS
Filed Dec. 29, 1955 5 Sheets-Sheet 1

INVENTOR.
WILLIAM M. SHOOK
BY Hudson, Boughton,
Williams, David & Hoffmann
ATTORNEYS Sept. 8, 1959  W. M. SHOOK  2,903,294
GRAPPLE FOR MATERIAL HANDLING AND EARTH MOVING APPARATUS
Filed Dec. 29, 1955  5 Sheets-Sheet 2
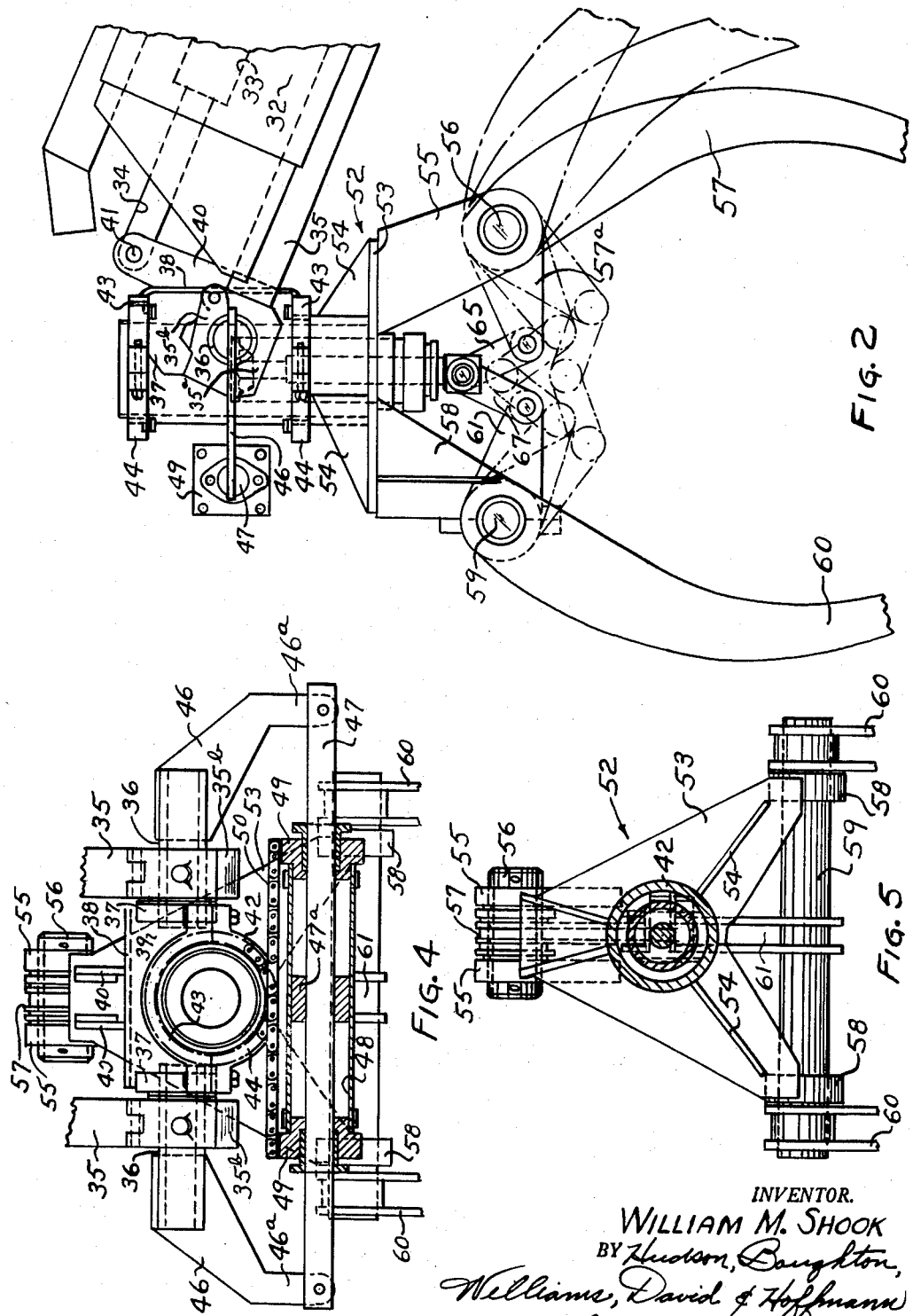
INVENTOR.
WILLIAM M. SHOOK
BY Hudson, Boughton,
Williams, David & Hoffmann
ATTORNEYS

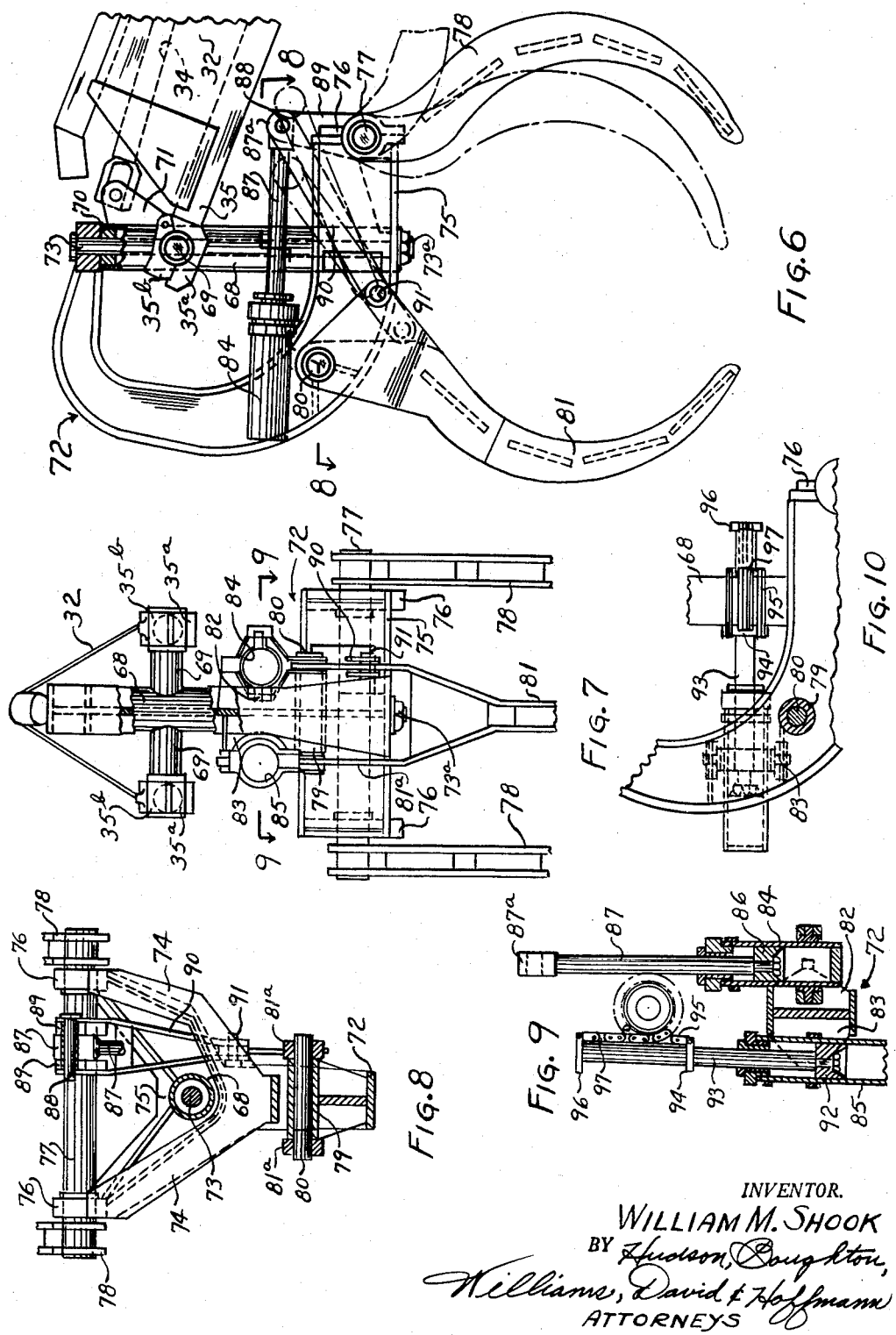

Sept. 8, 1959 W. M. SHOOK 2,903,294
GRAPPLE FOR MATERIAL HANDLING AND EARTH MOVING APPARATUS
Filed Dec. 29, 1955 5 Sheets-Sheet 4
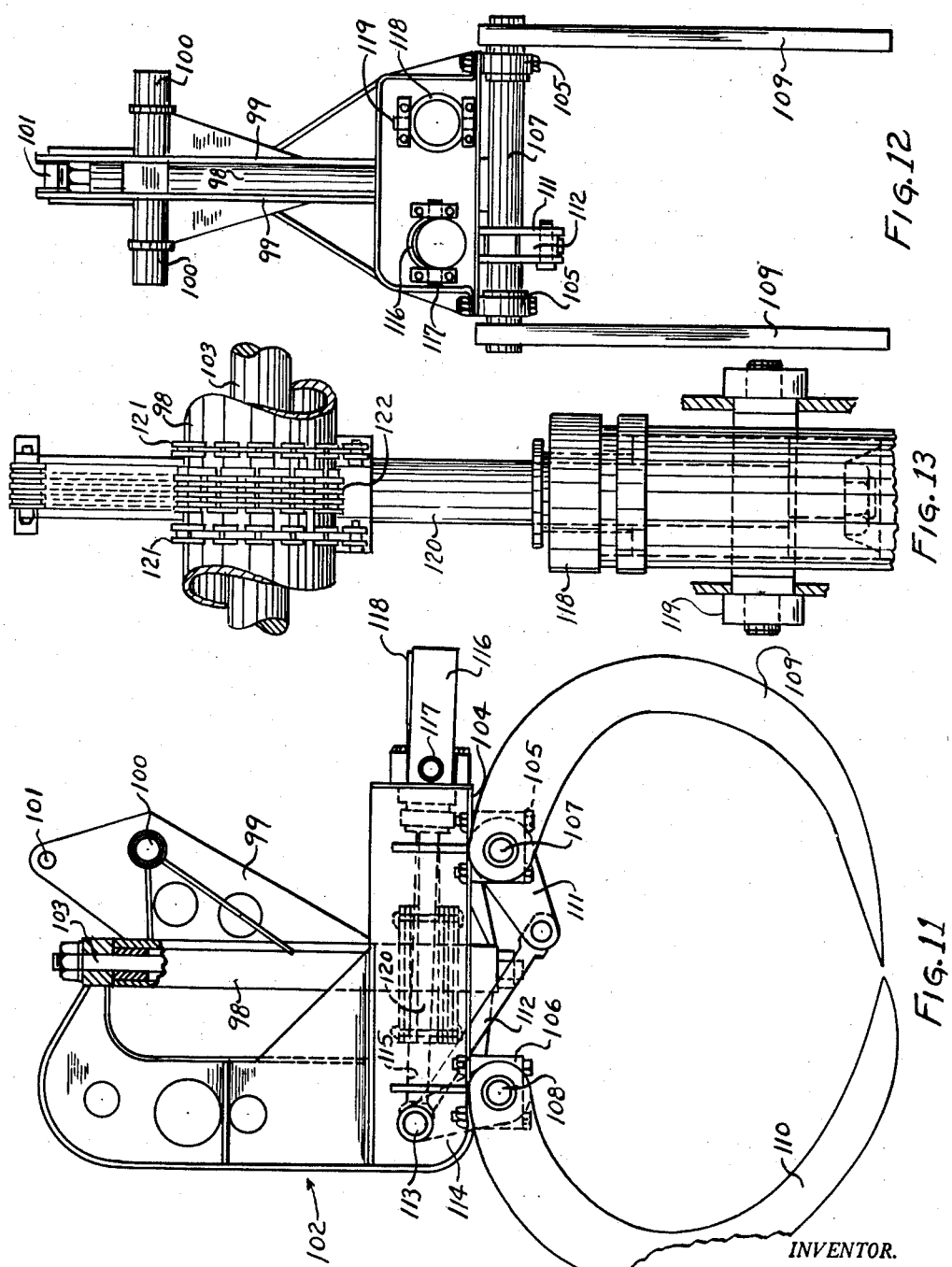
INVENTOR.
WILLIAM M. SHOOK
BY
ATTORNEYS Sept. 8, 1959 W. M. SHOOK 2,903,294
GRAPPLE FOR MATERIAL HANDLING AND EARTH MOVING APPARATUS
Filed Dec. 29, 1955 5 Sheets-Sheet 5
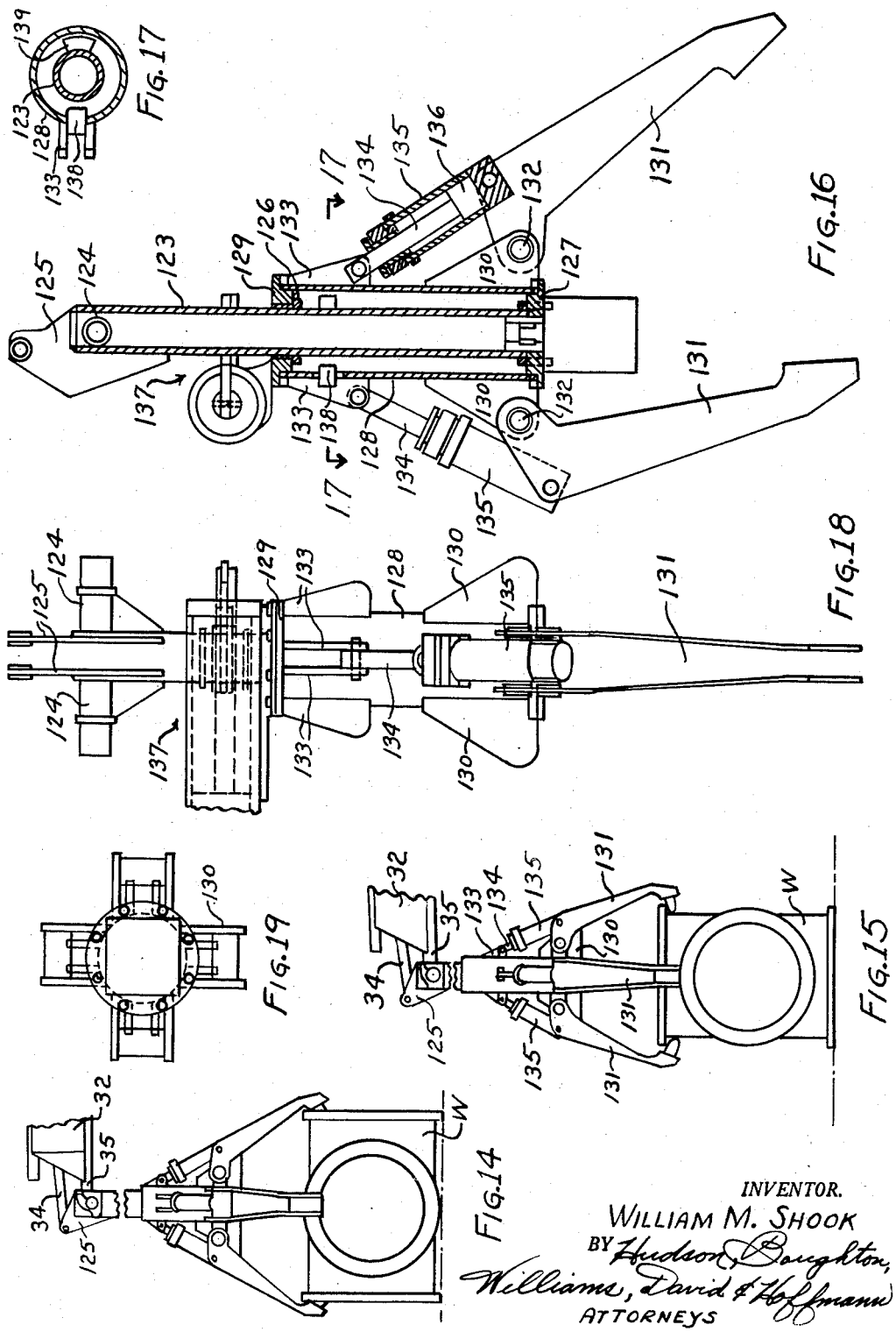
INVENTOR.
WILLIAM M. SHOOK
ATTORNEYS United States Patent Office 2,903,294
Patented Sept. 8, 1959

2,903,294

GRAPPLE FOR MATERIAL HANDLING AND EARTH MOVING APPARATUS

William M. Shook, New Philadelphia, Ohio, assignor to The Warner & Swasey Company, Cleveland, Ohio, a corporation of Ohio Application December 29, 1955, Serial No. 556,266

13 Claims. (Cl. 294—88)

This invention relates to a grapple and more particularly to a grapple supported at the end of a movable boom as, for instance, the movable boom of a material handling or earth moving apparatus.

Heretofore, grapples have been supported usually from the free end of a movable boom in a manner designated as "free swinging," in that the grapple is supported by a cable extending from the end of the boom and is free to swing or turn with the cable. These "free swinging" grapples cannot be positively controlled and are difficult to manipulate so as to position the grapples accurately in relation to the materials or articles to be engaged or gripped by the tongs or jaws of the grapples. In other words, the "free swinging" grapples cannot be positively positioned or oriented correctly with respect to the work to be engaged by the grapples.

There have been attempts to provide grapples at the free end of moving booms which are not supported by cables so as to be "free swinging" but such grapples have lacked universality of manipulating movements and have been complicated in construction.

An object of the invention is to provide a grapple construction supported by the free end of a movable boom, and such that the operator can readily and positively control the positioning and orientation of the grapple with respect to the work so as to facilitate the picking up of the work by the grapple.

Another object is to provide a grapple construction capable of suspension at the free end of a movable boom and wherein the grapple will have positive controlled turning and swinging movements in a plurality of directions to enable the operator to accurately locate the grapple in the desired relationship to the work.

A further object is to provide a grapple construction such as referred to in the preceding objects and wherein the positive movements of the grapple in a plurality of directions and the opening and closing of the tongs, jaws or arms of the grapple can be accurately controlled by the operator from a remote control station or position.

A still further object of the invention is to provide a grapple construction to be supported by the end of a movable boom so that the grapple can have bodily turning motion about a substantially vertical axis and a bodily swinging motion about a substantially horizontal axis as distinguished from a grapple supported at the end of a cable and subject to free swinging pendulum-like movements with the cable.

Another object of the invention is to provide a grapple construction supported at the free end of a movable boom for positive controlled turning and swinging movements about a plurality of angularly disposed axes and wherein certain of said turning movements, as well as the opening and closing of the jaws or tongs of the grapple, can be produced by power means carried by the grapple itself, even though such means may be controlled from a location remote to the grapple.

Although a grapple construction embodying the invention can have utility when used in connection with booms of various types, the invention has as a specific object the provision of a grapple construction to be connected to the free end of the extensible and retractable member of a telescoping boom to increase the utility of a multipurpose material handling and earth moving apparatus employing such a type of boom and capable of performing trenching, digging, grading and other similar operations by means of tools suitable for the particular operation connected to the free end of the extensible and retractable boom member.

Further and additional objects and advantages inherent in the invention and not hereinbefore specifically referred to will become apparent hereinafter during the detailed description of several embodiments of the invention which is to follow, said embodiments being illustrated in the accompanying drawings forming a part of this specification and wherein, Fig. 1 is a side elevational view of a multipurpose material handling and earth moving apparatus employing a telescoping boom and wherein the grapple construction embodying the invention is mounted on the free end of the extensible and retractable member of the telescoping boom.

Fig. 2 is a fragmentary elevational view of the free end of the extensible and retractable member of the telescoping boom shown in Fig. 1 and of a grapple construction embodying the invention and connected thereto, the jaws or tongs being indicated in one position by full lines and in other positions by dash and dot lines.

Fig. 4 is a view, partly in plan and partly in section, and is taken substantially along line 4—4 of Fig. 3 looking in the direction of the arrows.

Fig. 5 is a view, partly in section and partly in plan, and is taken along line 5—5 of Fig. 3 looking in the direction of the arrows.

Fig. 6 is a view similar to Fig. 2 but showing a different form of grapple construction embodying the invention than that shown in the previous views.

Fig. 7 is an end elevational view of the grapple construction shown in Fig. 6 and is taken looking from the left hand side of Fig. 6 with a portion of the C-shaped grapple head broken away to show the tubular spindle.

Fig. 8 is a view taken along line 8—8 of Fig. 6 looking in the direction of the arrows and is partially in section and partially in plan.

Fig. 9 is a sectional detail view taken substantially on line 9—9 of Fig. 7 looking in the direction of the arrows and with certain of the parts omitted.

Fig. 10 is a fragmentary view looking at the side of the grapple construction opposite to the side represented by Fig. 6 and illustrates the cylinder, piston and chain arrangement for rotating the grapple.

Fig. 11 is a side elevational view partly in section of a still different form of grapple construction embodying the invention.

Fig. 12 is an elevational view of the grapple construction shown in Fig. 11 and is taken looking from the right hand side of Fig. 11.

Fig. 13 is a view taken substantially from line 13—13 of Fig. 11 looking in the direction of the arrows.

Fig. 14 is a side elevational view of a still different form of grapple construction embodying the invention and shows the tongs of the grapple engaged with a work piece arranged in one position.

Fig. 15 is a view similar to Fig. 14 but shows the tongs of the grapple engaged with the work piece when arranged in a different position than in Fig. 14.

Fig. 16 is a view, partly in side elevation and partly in vertical section, of the grapple shown in Figs. 14 and 15.

Fig. 17 is a sectional view taken substantially on line 17—17 of Fig. 16 looking in the direction of the arrows.

Fig. 18 is a elevational view of the grapple shown in Fig. 16 and is taken looking from the left hand side of Fig. 16, and Fig. 19 is a top plan view of the grapple construction shown in Figs. 16 and 18 with the means for rotating the construction omitted.

As previously stated, a grapple construction embodying the invention can be advantageously used with various types of booms. However, for purposes of illustration and because it has particular utility when used with the extensible and retractable boom member of a telescoping boom, it will be so described herein.

Figure 1:
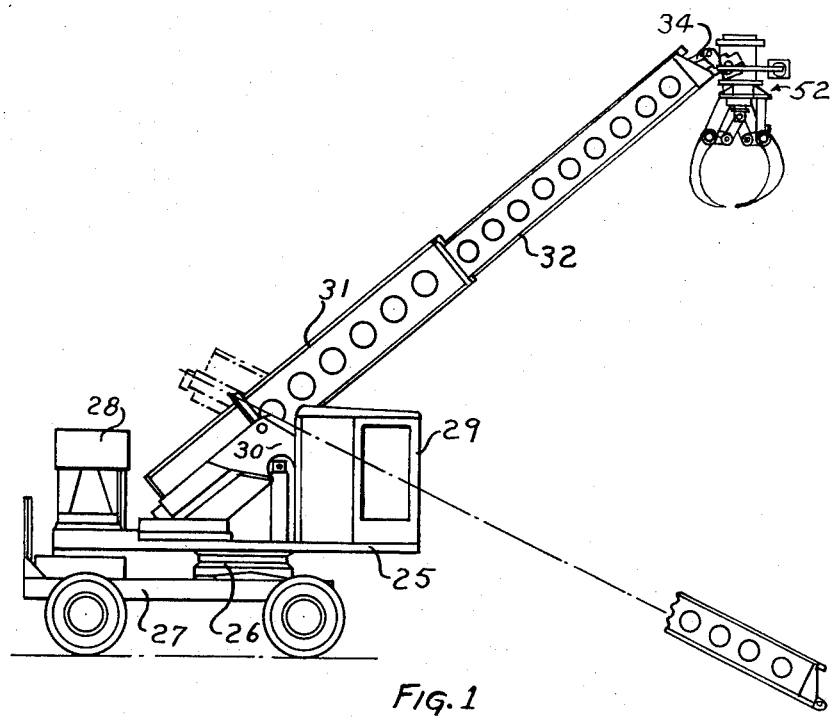

In Fig. 1 there is illustrated a multipurpose material handling and earth moving apparatus that is capable of performing trenching, digging, grading and other earth moving and material handling operations. Inasmuch as this type of apparatus is well known and is commercially made and sold by The Warner & Swasey Co. of Cleveland, Ohio under the trademark "Gradall" a brief description of the apparatus should suffice herein.

The apparatus comprises a supporting platform 25 carried by a turntable 26, in turn supported by a wheeled mobile vehicle 27 which may be of the trailer type or it may be a self-propelled vehicle. The platform 25 may be provided with a power source 28, such as an internal combustion engine and a compressor or pump, for energizing the pressure fluid circuits and power devices that operate the boom and the tools secured to the outer end of the extensible and retractable member thereof.

The platform 25 mounts an operator's control cab 29 and has suitable supports 30 in which the telescoping boom is pivotally mounted on a horizontal axis. The telescoping boom includes the boom member 31 that is pivotally connected to the supports 30 and the extensible and retractable boom member 32 that telescopes within the boom member 31.

Figure 3:
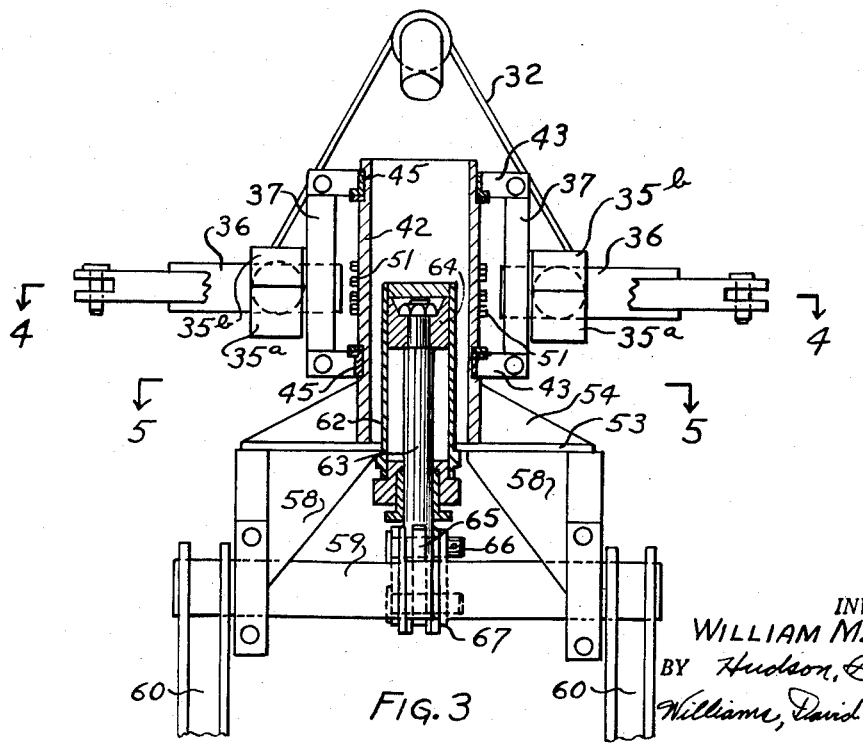
Fig. 3 is a front view of the grapple construction shown in Fig. 2 with the cylinder of the grapple rotating means omitted and with the rotatable support for the grapple and the means for opening and closing the grapple tongs shown in vertical section.

The boom member 32 is substantially triangular in cross section, as clearly indicated in Fig. 3, and it mounts within it a pressure fluid power device 33, the piston rod 34 of which device extends outwardly of the free end of the boom member 32 and may be designated as the tool operating rod since it is adapted to be connected to the tool that may be supported at the free end of the boom member 32. The description thus far set forth is known and per se forms no part of the present invention.

Referring to Figs. 2, 3 and 5 it will be seen that the extensible and retractable boom member 32 is provided with outwardly longitudinally projecting spaced parallel tool supporting elements 35 located substantially at the angles between the sides and base of the triangular boom member 32. The supporting elements 35 adjacent their outer ends have secured thereto the fixed halves 35a of bearing supports and which include halves 35b hinged to the halves 35a. Tubular trunnions 36 extend in a direction transversely of the boom member 32 and project inwardly and outwardly of the opposite sides of the bearing supports and are rockable therein.

The rockable trunnions 36 intermediate the bearing supports have secured to them so as to be supported thereby and to rock therewith a supporting cradle. This cradle comprises parallel substantially vertically extending side wall members 37 through which the trunnions 36 extend and are fixed thereto. The cradle also includes a rear wall 38 integral with or rigidly connected to the side wall members 37 and also connected at its top and bottom edges to top and bottom walls 39 which are cut away so the upper and lower ends of the side wall members 37 are exposed and also cut away on their front edges to accommodate elements later to be referred to.

The rear wall 38 of the cradle on its side adjacent to boom member 32 is provided with upwardly angularly extending parallel bracket arms 40 which may be either integral with the rear wall 38 or rigidly secured thereto. The upper ends of the bracket arms 40 are provided with aligned openings in which is mounted a connecting pin 41 extending through the outer end of the tool operating rod 34 and pivotally connecting said rod to the bracket arms 40. It will be seen that movement of the tool operating rod 34 inwardly or outwardly of the boom member 32 will effect rocking or swinging movement of the cradle and of the tubular trunnions 36 about the axial center line of the latter.

A vertically extending tubular hub 42 is rotatably supported in the cradle by a construction now to be explained. Secured to the upper and lower ends of the side wall members 37 by suitable means, such as by welding, securing bolts or the like, are semi-circular fixed supporting collars 43. Cooperating with the semi-circular fixed supporting collars 43 are removable semi-circular supporting collars 44 which can be bolted in assembled relationship to the collars 43, thus facilitating the assembly of the construction. When the collars 43 and 44 are secured together they provide vertically spaced apart aligned cylindrical bearing sleeves 45 in which rotatably interfit shouldered portions of the hub 42, suitable washers being interposed between the sleeves 45 and the shoulders on the hub. Inasmuch as the shoulders on the hub 42 are oppositely facing, it will be seen that said hub is rotatable in the collars but is held against axial movement relative to the collars.

It will be understood from the description heretofore set forth that the cradle, trunnions 36, supporting collars 43, 44 and hub 42 will rock or swing as a unit about a substantially horizontal axis relative to the supporting elements 35, while the hub 42 will rotate relative to the cradle and collars about an axis substantially perpendicular to the axis of the trunnions. In order to rotate the hub 42 about the last named axis there may be used an arrangement now to be described.

The outer ends of the tubular trunnions 36 are diametrically slotted to receive arms 46 which are fixed to the trunnions 36. The arms 46 extend angularly outwardly and forwardly in relation to the supporting elements 35 and at their free ends are provided with parallel portions 46a which are connected to the opposite ends of a fixed piston rod 47 located outwardly of the outer side of the hub 42. The rod 47 is provided with a piston 47a.

Movable on the rod 47 and piston 47a is a cylinder 48, the end closure plugs 49 of which have a sealed sliding support on the rod 47. It will be understood that the arms 46, rod 47 and cylinder 48 move as a unit with the trunnions 36, the supporting cradle, the collars 43, 44 and the hub 42 during the swinging movements thereof about the above mentioned substantially horizontal axis.

The right hand closure plug 49 of the cylinder 48 as viewed in Fig. 4 has connected to it one end of a whole or double leaf chain 50 which extends partially around the hub 42 and has its other end secured to the hub. The left hand closure plug 49 for the cylinder 48 as viewed in Fig. 4 has secured to it one end of two half or single leaf chains 51 which are partially wrapped around the hub 42 in a direction opposite to that of the chain 50 above and below the latter and have their other ends secured to the hub.

It will be understood that movement of the cylinder 48 in opposite directions on the rod 47 will act through the chains 50 and 51 to rotate the hub 42 in opposite directions about its vertical axis of rotation.

The hub 42 extends below the lowermost collars 43, 44 and has secured rigidly to it a grapple head indicated generally at 52. The grapple head 52 includes a triangularly shaped horizontal plate 53 interconnected on its upper side with the hub 42 by reenforcing or strengthening ribs 54. The substantially triangularly shaped plate 53 at its apex or rear is provided on its underside with spaced downwardly and rearwardly disposed parallel supporting arms 55 between which on a shaft 56 carried thereby there is swingably mounted a single grapple tong or jaw 57. The tong 57 has an actuating portion 57a extended inwardly of the supporting arms 55 and beyond the shaft 56 for a purpose later to be explained.

The underside of the plate 53 at its front or outer corners is provided with downwardly extending supporting members 58 which adjacent their lower ends rockably mount a shaft 59 the opposite ends of which extend beyond the members 58 and on which ends are secured the tongs or jaws 60 of the grapple. The shaft 59 intermediate the supporting members 58 has secured to it an actuating arm 61 which extends toward the actuating portion 57a of the tong or jaw 57 of the grapple and which will later be referred to.

Secured in the plate 53 and extending above and below said plate and centrally upwardly within the hub 42 is a cylinder 62, the opposite ends of which are closed and sealed in a manner usual in pressure fluid cylinders. A piston rod 63 is slidably supported by the closure for the lower end of the cylinder 62 and projects downwardly below said closure. The piston rod 63 has secured to its upper end within the cylinder 62 a piston 64 that is slidable in the cylinder. The lower end of the piston rod 63 is forked and is pivotally connected to one end of a link 65, the opposite end of which is pivotally connected to the actuating portion 57a of the single rear jaw or tong 57.

The piston rod 63 is also pivotally connected, by the same pintle pin 66 that connects it to the link 65, to one end of a pair of links 67. The opposite ends of the links 67 are pivotally connected to the free end of the actuating arm 61.

It will be seen that vertical movement in opposite directions of the piston rod 63 and piston 64 in the cylinder 62 will cause, through the links 65 and 67, inward and outward uniform swinging movement of the tongs or jaws 57 and 60 of the grapple.

It will be seen from the description of the embodiment of the invention illustrated in Figs. 2 to 5 inclusive that the grapple and its supporting cradle can be swung vertically about the horizontal axis of the trunnions 36. Also the grapple and the hub 42 can be rotated relative to the cradle and boom about the vertical axis of the hub.

The swinging and rotating movements of the grapple as just referred to can be effected by the pressure fluid power device 33 and the pressure fluid power means composed of the piston 47a and cylinder 48 and both of which can be controlled by the operator in the control cab 29. Also the tongs or jaws 57 and 60 of the grapple can be opened and closed by the operator by means of the pressure fluid power mechanism composed of the piston 64 and cylinder 62.

It will be understood that suitable pressure fluid conduits will extend to the various pressure fluid power devices from a supply source of pressure fluid and that the pressure fluid circuits include suitable control mechanism located in the control cab 29. Inasmuch as these circuits form no part of the present invention and are well understood the same have not been illustrated herein.

Not only can the operator swing the boom about the vertical axis of the turntable 26 and about the horizontal pivoted connection between the support 30 and the boom member 31 but also the extensible and retractable boom member can be moved inwardly and outwardly relative to the boom member 31. In addition, the grapple can be swung about the horizontal axis and can be rotated about the vertical axis. Consequently the operator can accurately manipulate and position the grapple relative to the work and since the swinging and rotating movements are positive ones he can positively control the positioning of the grapple, which is not the case with grapples of the free swinging type that are supported at the end of a cable.

Another embodiment of the invention is illustrated in Figs. 6 to 10 inclusive. This embodiment includes a tubular spindle 68 which has rigidly secured to it or formed on it aligned diametrically opposed trunnion arms 69 which are rockable in the bearing supports carried by the supporting elements 35 of the boom member 32 and formed of the fixed halves 35a and the upper hinged halves 35b previously referred to.

The upper and lower ends of the tubular spindle 68 are closed by suitable plugs, the upper one of which is indicated at 70 in Fig. 6. Also the tubular spindle 68 has fixed to or formed on it bracket arms 71 similar to the previously described bracket arms 40 and which bracket arms 71 are operatively connected to the tool operating rod 34. It will be seen that actuation of the tool operating rod 34 by the pressure fluid power device 33 in the boom member 32 will effect swinging movement of the spindle 68 about the axis of the trunnions 69.

A C-shaped grapple supporting head indicated generally at 72 is secured to the opposite ends of the spindle 68 so as to swing relative to the spindle 68 about the vertical axis passing centrally through the spindle. The supporting head 72 is connected to swing relative to the spindle 68 by means of a headed connecting bolt 73 passing downwardly through the upper end of the spindle and mounting on its lower end a nut 73a.

The C-shaped head 72 is substantially of I-beam configuration in cross section, and its lower end portion is substantially perpendicular to the spindle 68 and is provided with divergent arms 74 interconnected by web portion 75 through which the spindle 68 passes and against the underside of which bears the nut 73a and its associated washer. The arms 74 of the supporting head 72 at their free ends are provided with bearing supports 76 in which is rotatably mounted a shaft 77. The shaft 77 extends outwardly of the bearing supports 76 and has secured to its opposite ends grapple tongs or jaws 78. The C-shaped supporting head 72 adjacent to the end of its lower horizontal portion from that where the bearing supports 76 are located and slightly above the level of the shaft 77 is provided with a bearing sleeve 79 extending transversely of the web of the head 72 and mounting therein a pintle 80 which has its opposite ends projecting outwardly beyond the opposite ends of the sleeve 79. A grapple jaw or tong 81 is provided at its upper end with a forked portion, the tines 81a of which are rockably supported on the opposite ends of the pintle 80.

The C-shaped head 72 above the bearing sleeve 79 and pintle 80 and on opposite sides of the web of the head has secured to it supports 82 and 83 for pressure fluid cylinders 84 and 85 respectively. The cylinder 84 has slidable therein a piston 86 to which is connected a piston rod 87 extending outwardly of one end of the cylinder 84 and provided at its free end with a connecting boss 87a through which extends a connecting pin 88.

An actuating arm 89 is fixed to the shaft 77 intermediate the bearing supports 76 and its free end is forked and straddles the connecting boss 87a of the piston rod 87 and is pivoted on the connecting pin 88. Also pivoted on the connecting pin 88 and outwardly of the actuating arm 89 is a link 90 that extends to and is pivotally connected with one of the tines 81a of the grapple jaw or tong 81 as indicated at 91.

It will be seen that when pressure fluid is introduced into the cylinder 84 to one side or the other of the piston 86 so that said piston moves in one direction or the other within the cylinder, the piston rod 87 will effect equalized swinging movement of the grapple tongs or jaws 78 and 81 toward and from each other as the case may be.

The support 82 for the cylinder 84 is such as to allow compensating swinging movement of the cylinder to take care of the small arcuate movement of the connecting boss 87a at the outer end of the rod 87 in moving the actuating arm 89 and the link 90.

The cylinder 85 slidably mounts a piston 92 to which is connected one end of a piston rod 93 that projects outwardly of the cylinder 85. The piston rod 93 mounts inwardly of its outer end an anchoring member 94 to which are secured one end of a pair of single or half leaf chains 95. The half chains 95 are spaced apart in a vertical direction and are partially wrapped around and are dead-ended and secured to the tubular spindle 68.

The outer end of the piston rod 93 has fixed to it a chain anchoring member 96 to which is secured one end of a whole or double leaf chain 97 which is partially wrapped around the spindle 68 intermediate the half chains 95 and in the opposite direction to the latter and is dead-ended and connected to the spindle.

Reference to Fig. 9 shows the cylinder 85 and piston rod 93 are not parallel to the piston rod 97 and cylinder 84 and are disposed at an angle to the vertical plane of the axis of the spindle 68. When the piston 92 and rod 93 move in opposite directions such movements are resisted by the chains 95 and 97 which are dead-ended to the non-rotatable spindle 68. This resistance is transmitted by the piston rod 93 and piston 92 to the angularly disposed cylinder 85 and produces a turning force to impart limited turning movement to the C-shaped grapple head 72 in one or the other direction. It has been found that a turning movement of 50° each side of a central position is thus provided and this total 100° movement is adequate in positioning the grapple relative to the work.

In Figs. 11 to 13 inclusive a further different form of construction embodying the invention is illustrated and will now be described.

In this form of construction the tubular spindle or support 98, similar to the tubular spindle or support 68 of the construction shown in Figs. 6 to 10 inclusive, has secured thereto or integral therewith parallel arms 99 which mount trunnions 100 that can be rockably supported in the bearing supports carried by the supporting elements 35 of the boom member 32 and formed of the fixed halves 35a and the upper hinged halves 35b previously referred to but not shown in Figs. 11 and 12.

The upper ends of the parallel arms 99 mount a connecting pin 101 by which the tool operating rod 34 previously referred to can be connected to the arms 99, so that movement of said rod will swing or rock the tubular spindle 98 about the axis of the trunnions 100. Further description of the tubular spindle 98 need not be set forth since it is the same as in the construction shown in Figs. 6 to 10 inclusive.

The tubular spindle 98 mounts a C-shaped grapple head 102 to swing about the axis of the rod 103 similarly to the C-shaped grapple head 72 of the previously described form. The grapple head 102 at its lower end is provided with a grapple supporting portion 104 which is substantially perpendicular to the spindle 98 and has secured to its underside bearing blocks 105 and 106, there being two of the blocks 105 and two of the blocks 106.

The bearing blocks 105 rockably mount a shaft 107 while the bearing blocks 106 rockably mount a shaft 108 spaced from the shaft 107 but parallel thereto. The shafts 107 and 108 extend beyond the bearing blocks 105 and 106 and mount, respectively, on their extending ends grapple tongs or jaws 109 and 110, there being two of the tongs 109 and two of the tongs 110 so that the grapple in this form of construction is a four tong or jaw grapple.

The shaft 107 has fixed to it inwardly of the left hand bearing block 105 in Fig. 12 a lever arm 111, to the outer free end of which is pivotally connected one end of a link 112, the other end of which link mounts a connecting pin 113 which pivotally connects the link to the outer end of a lever arm 114 that has its other end fixed to the shaft 108. The connecting pin 113, in addition to interconnecting the link 112 and the lever arm 114 operatively together, connects said link and lever arm operatively to the outer end of a piston rod 115 that extends into a cylinder 116 and is provided with a piston slidable therein as will be well understood.

The cylinder 116 is supported by the lower portion of the grapple head 102 so as to have rocking movement about a horizontal axis 117. It will be understood that suitable pressure fluid connections extend to the cylinder 116 so that the piston rod 115 and its associated piston can be moved in opposite directions by pressure fluid under the control of the operator, such movement acting through the link 112 and the lever arms 111 and 114 to swing the tongs 109, 110 toward and from each other with an equalized movement.

The lower portion of the C-shaped grapple head 102 and on the side of the spindle 98 opposite to the side thereof where the piston rod 115 is located, mounts a cylinder 118 so as to have rocking movement about a vertical axis 119. The cylinder 118 is provided with a piston (not shown) secured to a piston rod 120 that extends outwardly from the cylinder 118 at one end thereof and at an angle to the vertical plane in which the axis of the spindle 98 is located.

The piston rod 120, similarly to the piston rod 93 of the previously described form, has secured to it adjacent its outer end and in vertically spaced relationship two half chains 121 which are partially wrapped around the spindle 98 in one direction and have their opposite ends dead-ended and secured to the spindle. The piston rod 120 inwardly of its outer end has secured to it one end of a whole or double chain 122 which is partially wrapped around the spindle 98 intermediate the chains 121 and in the opposite direction and has its opposite end dead-ended and secured to the spindle 98.

It will be understood that the cylinder 118 is connected to a source of pressure fluid under the control of the operator so that movement of the piston rod 120 in opposite directions can be effected and that such movement, through the chains 121 and 122, will cause the C-shaped grapple head 102 to swing relative to the spindle 98 about the axis of the rod 103 in the same way as described with respect to the swinging movement of the C-shaped grapple head 72 shown in the previously described form that is illustrated in Figs. 6 to 10 inclusive.

In Figs. 14 to 19 inclusive there is illustrated a form of grapple construction embodying the invention and which construction is adapted for lifting and moving work such as lengths of pipe. In Fig. 14 two of the grapple tongs or arms are shown engaged with the ends of a T-shaped pipe length or work piece W that is in horizontal position, the other two tongs or jaws being shown engaged with the ends of the cross portions of the work piece. In Fig. 15 the work piece W is in vertical position and the four tongs or jaws of the grapple are engaged with it at the flanged upper end thereof.

This form of construction embodying the invention comprises a cylindrical hub or support 123 mounting at its upper end trunnion arms 124, the outer ends of which are supported in the bearing supports carried by the supporting elements 35 of the boom member 32 and formed of the fixed halves 35a and the hinged halves 35b previously referred to.

The hub 123 at its upper end has fixed to it or integral with it parallel upwardly extending bracket arms 125 between which extends the end of the tool operating rod 34 which is connected thereto by the usual connecting pin. It will thus be seen that the hub 123 can be rocked about the axis of the trunnion arms 124 by the movement of the rod 134 inwardly or outwardly under the control of the operator.

The hub 123 has secured to it a bearing and supporting flange or ring 126 intermediate the ends of the hub and at its lower end has fixedly secured to it an annular supporting member 127.

A tubular grapple head 128 is supported by the flange or ring 126 and the supporting member 127 so as to have rotation or turning movement relative to the hub 123, the upper end of said head 128 mounting a closure and supporting plug 129. The grapple head 128, adjacent its lower end, is provided on its circumference with radially extending, equally circularly spaced tong supporting fins 130, there being four such fins. The four grapple tongs 131 are provided at their upper ends with short angularly disposed arm portions that are pivotally connected to the lower ends of the fins 130 as indicated at 132.

Just below the plug 129 the grapple head 128 is provided with four radial equally circularly spaced fins 133 to which are pivotally connected the outer free ends of piston rods 134. The piston rods 134 extend into cylinders 135 and are provided therein with pistons 136. The cylinders 135 at their lower ends are pivotally connected to the upper ends of the tongs 131.

It will be understood that the cylinders 135 will be connected to a source of pressure fluid under the control of the operator, so that movement in opposite directions of the pistons 136 and piston rods 134 relative to the cylinders can be effected to cause equalized inward and outward movements of the tongs 131 about the pivotal connections 132.

As previously stated, the grapple head 128 can have relative rotation with respect to the hub 123 and this may be effected by means of a cylinder, piston rod and chain arrangement indicated in its entirety at 137 and corresponding with the arrangements for rotating the C-shaped grapple heads 72 and 102 relative to their supporting spindles 68 and 98 of the last two described forms of construction, and hence it it not necessary to explain this again in detail.

The tubular grapple head 128 may be provided with a radial inwardly extending stop or abutment piece 138 while the hub 123 may be provided with a radial outwardly extending stop 139. It will be seen that the stops or abutments 138, 139 will function to limit the turning movement of the tubular grapple head 128 relative to the hub 123 and in opposite directions.

From the description set forth relative to the construction shown in Figs. 14 to 19 inclusive it will be understood that the operator from the control cab can swing the construction vertically about the horizontal axis of the trunnions 24, can rotate the grapple head relative to its support about the vertical axis of the hub 123 and can open and close the jaws or tongs 131, all such movements being power effected and positive so that the grapple can be accurately manipulated relative to the work.

Although several embodiments of the invention have been illustrated and described herein it will be understood that the invention is susceptible of various modifications and adaptations within the scope of the appended claims.

Having thus described my invention, I claim:

1. A grapple construction comprising a support member pivotally connected to a carrying element such as a boom to swing relative thereto on an axis extending transversely of said carrying element, a grapple head member carried by said support member to have turning movement relative thereto about an axis fixed relative to said support member and extending substantially transversely to the axis of the swinging movement of the support member, grapple tongs pivotally connected to said grapple head member, power means for actuating said tongs, a power device carried by one of said members and having a linearly reciprocating element, and flexible actuating elements having intermediate their ends a driving relationship with the other of said members and connected to said reciprocating element at points spaced longitudinally thereof to produce said turning movement between said members in one or the other direction upon reciprocation of said reciprocating element.

2. A grapple construction as defined in claim 1 and wherein said flexible elements are chains.

3. A grapple construction as defined in claim 1 and wherein said power device is a pressure fluid device having a cylinder and a piston rod, one of which is the reciprocating element of the device.

4. A grapple construction comprising a cradle-like support having spaced parallel side walls, said side walls being provided with means adapted to be pivotally connected to a carrying element such as a boom to swing relative thereto about an axis extending transversely of said carrying element, said side walls being provided at their opposite ends with bearing supports, a cylindrical grapple head rotatable in said bearing supports to have turning movement relative to said cradle support, about an axis fixed relative to said cradle support and extending substantially transversely to the axis of the swinging movement of the cradle support, grapple tongs pivotally connected to the lower end of said grapple head, power actuated piston means carried by said grapple head and having operative connections with said tons for actuating the latter, and power actuated means carried in part by said cradle support and in part by said grapple head and including operative connections for turning said head relative to said cradle support.

5. A grapple construction comprising a tubular supporting spindle adapted to be pivotally connected to a carrying element such as a boom to swing relative thereto on an axis extending transversely of said carrying element, a grapple head connected to said spindle at points spaced longitudinally thereof to turn relative to the spindle about the axis of the latter, grapple tongs pivotally connected to said head adjacent an end thereof, power actuated means carried by said head and operatively connected to said tongs to move the latter toward and away from each other, and power actuated means also carried by said head and including a pressure fluid cylinder supported by said head to have rocking movement relative thereto about an axis substantially parallel to the axis of said spindle, a piston rod extending from said cylinder and located in a plane disposed at an angle to a plane passing through the axis of said spindle transversely to the axis of the swinging movement of the spindle relative to the carrying element, and operative connections between said piston rod and said spindle and including flexible elements connected to said piston rod at locations spaced longitudinally thereof and partially wrapped around said spindle in opposite directions and secured to said spindle to cause rotation of said head relative to said spindle.

6. A grapple construction as defined in claim 5 and wherein said flexible elements are in the form of two half chains having one of their ends secured to the piston rod at the same longitudinal location thereon and a whole chain having one of its ends secured to said piston rod at a longitudinal location spaced with respect to the first named location, said half chains being partially wrapped around said spindle and having the other of their ends secured to said spindle and said whole chain being partially wrapped around said spindle intermediate said half chains and in the opposite direction and having its end secured to said spindle.

7. A grapple construction as defined in claim 5 and wherein said power actuated means for actuating said tongs includes separate pressure fluid cylinders pivotally connected to said tongs, pistons slidable in said cylinders, and piston rods extending from said pistons outwardly of said cylinders and pivotally connected to said head while said power actuated means for rotating said head relative to said spindle is mounted on the end of said head which is adjacent to said carrying element.

8. A grapple construction comprising a cradle-like support having spaced parallel side walls, said side walls being provided with means pivotally connected to a carrying element such as a boom to swing relative thereto about an axis extending transversely of said carrying element, said side walls being provided at their opposite with bearing supports, a cylindrical grapple head turnable in said bearing supports to have turning movement relative to said cradle support about an axis fixed relative to said cradle support and extending substantially transversely to the axis of the swinging movement of the cradle support, grapple tongs pivotally connected to the lower end of said grapple head, power means for actuating said tongs, and power actuated means carried in part by said cradle support and in part by said grapple head for turning said grapple head relative to said cradle support, said power actuated means including a pressure fluid actuated device having a piston rod fixedly carried by said cradle support and a reciprocal cylinder on said piston rod, flexible elements connected to said reciprocal cylinder at longitudinally spaced locations thereon and extending around said cylindrical grapple head and connected thereto, certain of said flexible elements extending around said grapple head in one direction and the other of said elements extending around said grapple head in the opposite direction.

9. A grapple construction comprising a tubular supporting spindle pivotally connected to a carrying element such as a boom to swing relative thereto about an axis extending transversely of said carrying element, a grapple head connected to said spindle at points spaced longitudinally thereof to turn relative to the spindle about the axis of the latter, grapple head tongs pivotally connected to said head, power means for actuating said tongs, and power actuated means carried by said head, operative connections between said power actuated means and said spindle for rotating said head relative to said spindle, said power actuated means including a pressure fluid cylinder supported by said head and having a piston rod extending therefrom and located in a plane disposed at an angle to a plane passing through the axis of said spindle, and said operative connections including flexible elements connected to said piston rod at locations spaced longitudinally thereof and partially wrapped around said spindle in opposite directions and secured to said spindle.

10. A grapple construction comprising a tubular spindle pivotally connected to a carrying element such as a boom to swing relative thereto about an axis extending transversely of said carrying element, a cylindrical grapple head concentrically mounted on said spindle to turn relative thereto about the axis of the spindle perpendicular to a plane having the axis of the swinging movement of said tubular spindle located therein, grapple tongs pivotally connected to said head, power means for actuating said tongs, power actuated means carried in part by said head and in part by said tubular cylinder, operative connections between said power actuated means and said spindle for effecting turning movement of the head relative to the spindle upon actuation of said power actuated means, and separate power actuated piston means carried by said head and operatively connected to said tongs for actuating the latter.

11. A grapple construction comprising a cylindrical spindle pivotally connected to a carrying element such as a boom to swing relative thereto about an axis extending transversely of said carrying element, a substantially C-shaped grapple head supported on said spindle adjacent the opposite ends of the latter to turn relative thereto about the longitudinal axis of the spindle perpendicular to a plane having the axis of the swinging movement of said tubular spindle located therein, grapple tongs pivotally connected to said grapple head adjacent the lower end thereof, power means for actuating said tongs, power actuated means carried in part by said grapple head and in part by said spindle, operative connections between said power actuated means and said spindle for causing turning movement of said grapple head relative to said spindle upon actuation of said power actuated means.

12. A grapple construction comprising a support member pivotally connected to a carrying element such as a boom to swing relative thereto on an axis extending transversely of said carrying element, a grapple head of substantially cylindrical configuration rotatably carried by said support member to have turning movement relative thereto about an axis fixed relative to said support member and extending substantially transversely to the axis of the swinging movement of the support member, grapple tongs pivotally connected to said grapple head, power means for actuating said tongs; and power actuated means carried by said support member including a linearly movable element, flexible actuating elements connected to said linearly movable element at longitudinally spaced locations thereon and extending partially around said grapple head and secured thereto for turning the grapple head relative to the support member, certain of said flexible elements extending in one direction around said grapple head and other of said flexible elements extending in the opposite direction around said grapple head.

13. A grapple construction comprising a support member pivotally connected to a carrying element such as a boom to swing relative thereto on an axis extending transversely of said carrying element, a grapple head of substantially cylindrical configuration rotatably carried by said support member to have turning movement relative thereto about an axis fixed relative to said support member and extending substantially transversely to the axis of the swinging movement of the support member, grapple tongs pivotally connected to said grapple head, a pressure fluid actuated device mounted internally of said grapple head and having a reciprocating piston rod, operative connections between said piston rod and said tongs for producing equalized movement of said tongs toward and away from each other upon reciprocation of said piston rod, power actuated means carried by said support member and including a reciprocable element, flexible actuating elements connected to said reciprocable element at longitudinally spaced locations thereon and extending partially around said grapple head and secured thereto for turning the grapple head relative to the support member, certain of said flexible elements extending in one direction around said grapple head and other of said flexible elements extending in the opposite direction around said grapple head.

References Cited in the file of this patent

UNITED STATES PATENTS

| | | |
|---|---|---|
| 2,226,789 | Tupy | Dec. 31, 1940 |
| 2,229,800 | Dean | Jan. 28, 1941 |
| 2,672,364 | Ragland | Mar. 16, 1954 |
| 2,725,996 | Britton | Dec. 6, 1955 |
| 2,765,939 | Hellerud | Oct. 9, 1956 |
| 2,778,514 | McLean | Jan. 22, 1957 |
| 2,788,143 | Tendresse | Apr. 9, 1957 |
| 2,789,716 | Wolf | Apr. 23, 1957 |